No. 644,443. Patented Feb. 27, 1900.
J. F. McELROY.
FRICTION ROLLER.
(Application filed Jan. 12, 1898.)
(No Model.)
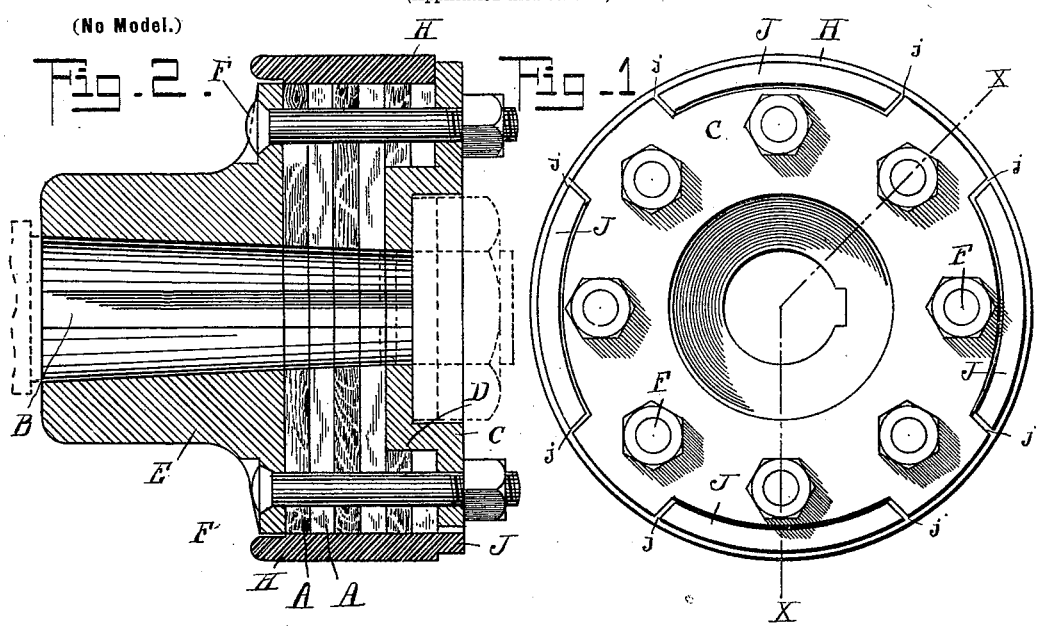
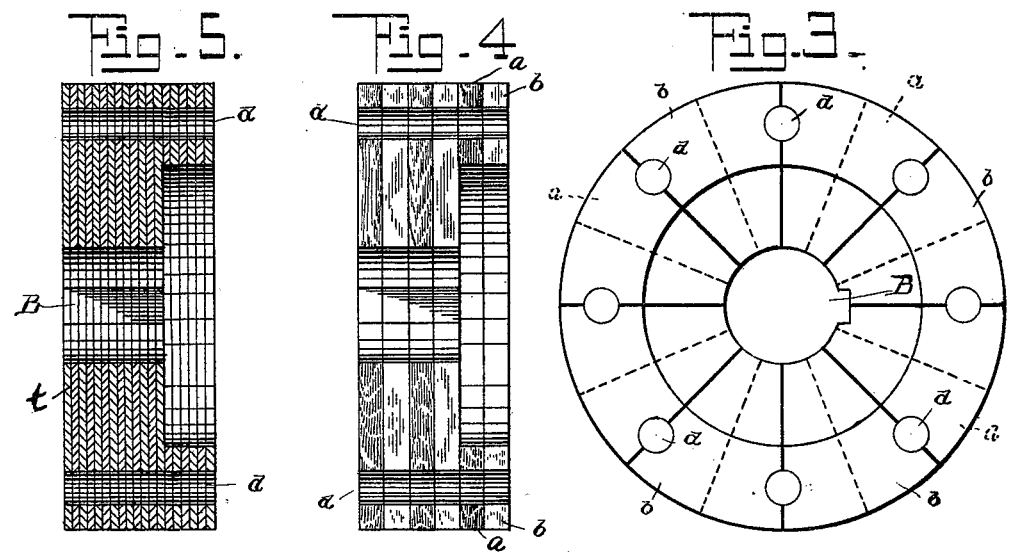

UNITED STATES PATENT OFFICE.

JAMES F. McELROY, OF ALBANY, NEW YORK, ASSIGNOR TO THE CONSOLIDATED CAR-HEATING COMPANY, OF SAME PLACE.

FRICTION-ROLLER.

SPECIFICATION forming part of Letters Patent No. 644,443, dated February 27, 1900.

Application filed January 12, 1898. Serial No. 666,464. (No model.)

*To all whom it may concern:*

Be it known that I, JAMES F. MCELROY, a citizen of the United States, residing in the city and county of Albany, State of New York, have invented certain new and useful Improvements in Friction-Rollers, of which the following is a specification.

My invention relates to improvements in devices for causing rotation by means of frictional contact; and the object of my invention is to provide a friction-roller adapted for use in connection with the drive-wheels of locomotives, cars, and other vehicles and so constructed and arranged that the noise attendant upon the use of friction-rollers shall be reduced to a minimum. I attain this object by means of the mechanism illustrated in the accompanying drawings, in which—

Figure 1 is an end elevation. Fig. 2 is a section along the lines $x\ x$ on Fig. 1. Fig. 3 is an end elevation of a modified form of the roller with the tire removed. Fig. 4 is a section of Fig. 3, showing the wheel composed of layers of wood. Fig. 5 is a section similar to Fig. 4, in which the wheel is made of rawhide.

Similar letters refer to similar parts throughout the several views.

One of the principal objections to the use of friction-rollers to drive the wheels of a street-car truck is that a considerable noise is occasioned. This is largely due to the fact that the drive-wheels of a truck are seldom, if ever, perfectly round and seldom present an uninterruptedly-smooth surface. There are always irregularities occasioned by the faulty construction or wear of the wheels on the track—pounding and other causes—and when these irregularities of one wheel come in contact with the friction-roller a vibration takes place which is communicated to the opposite wheel, adjacent to the friction-roller, and there meeting with vibrations occasioned by the irregularities of said last-mentioned wheel are conducted back to the first, causing a mixture of vibrations extending from one drive-wheel to the other through the friction-roller and causing a loud and high-pitched sound.

By my invention I provide a tire which will give, it being thin enough to spring slightly, the spring taking place from circumference to circumference along the diameter of the roller, the construction of the core being such (it being made of wood, paper, rawhide, or other yielding substance) that it will allow the tire to assume an elliptical form.

The friction-roller is made up of the casting E, a series of layers of wood, paper, rawhide, or other non-metallic substance A A forming a core, a disk C, and a tire H.

In Fig. 2, A A represent a series of layers of wood or other non-metallic substance secured together by glue or other similar substance, cored out to permit of the passage of the roller-shaft B and for the insertion of the projection D on the disk C, which is placed on the end of the roller, the projecting portion D fitting within the core in an opening cut from the same, as shown in Fig. 2. The disk C and the core are secured to the casting E by means of a series of bolts F. The tire H surrounds the core and is provided along its end with a series of projections J J, which fit within the openings $j\ j$ in the disk C. (Shown in Figs. 1 and 2.) The tire H is made of a thin piece of steel or other metal, and when placed between the drive-wheels in a truck the irregularities in the wheel will cause the tire to spring, preventing the vibrations passing from one drive-wheel to the other.

In Figs. 3 and 4 I show one means of building up the non-metallic portions of the roller which is specially adapted for use when the core is to be constructed of wood. I cut the layers of wood in the form shown by dotted lines in Fig. 3, making a series of triangular-shaped portions $a\ a$, which are placed side by side, forming one layer of the core. Upon that layer I place another layer of triangular-shaped pieces $b\ b$, (shown by full lines in Fig. 3,) which are arranged to overlap the joints made by the pieces $a\ a$. In this way each succeeding layer of triangular portions lies side by side, overlapping the joints of the layer next beneath it, the layers being secured together by glue or other substance. The object of constructing the core in this manner is to arrange it so that the fiber of the wood will present its end to the action of the drive-wheels with which the tire comes in contact, each of the sections being so constructed that the fiber exposes its end to the periphery. The core is then cored out to allow for the passage of the roller-shaft B and for the insertion of the projection D on the disk C, as shown in Figs. 1 and 2, and is mounted on the casting E by means of bolts F, placed through the bolt-holes $d\ d$.

In Fig. 5 I show a roller made of rawhide or compressed paper, which may be made by uniting the layers $t$ and building them up in the manner described, as used in reference to Figs. 3 and 4, or it may be constructed as described in reference to Figs. 1 and 2.

What I claim as my invention, and desire to secure by Letters Patent, is—

A friction-roller, comprising a casting, a yielding core, a thin metallic tire, a disk, and locking-horns on the edge of said tire engaging with openings in said disk, substantially as described.

In witness whereof I have hereunto set my hand this 10th day of January, 1898.

JAMES F. McELROY.

Witnesses:
W. W. ERWIN,
CHAS. B. MITCHELL.